No. 850,682. PATENTED APR. 16, 1907.
J. SMITH.
POTATO DIGGER.
APPLICATION FILED MAR. 17, 1906.
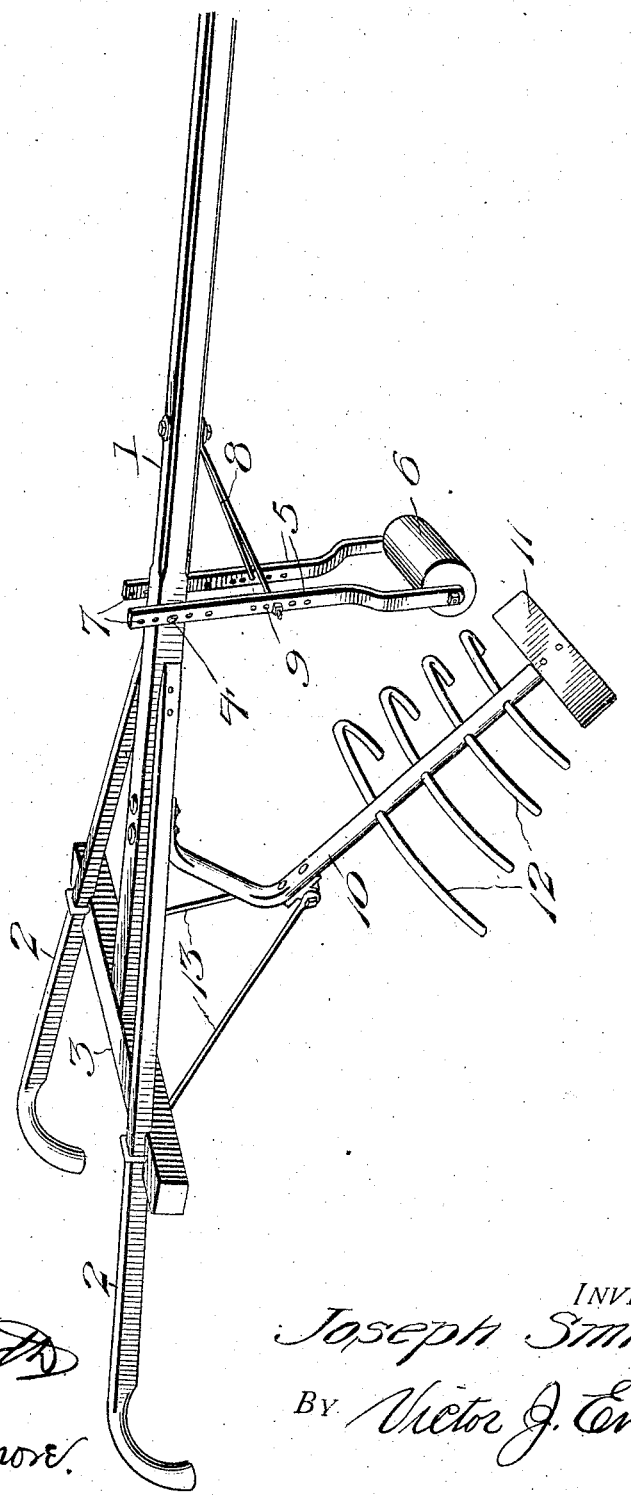
WITNESSES:
INVENTOR
Joseph Smith,
BY
Attorney

UNITED STATES PATENT OFFICE.

JOSEPH SMITH, OF ELYRIA, OHIO, ASSIGNOR OF ONE-HALF TO GEORGE T. BIGGS, OF ELYRIA, OHIO.

POTATO-DIGGER.

No. 850,682.      Specification of Letters Patent.      Patented April 16, 1907.

Application filed March 17, 1906. Serial No. 306,640.

*To all whom it may concern:*

Be it known that I, JOSEPH SMITH, a citizen of the United States, residing at Elyria, in the county of Lorain and State of Ohio, have invented new and useful Improvements in Potato-Diggers, of which the following is a specification.

This invention relates to potato-diggers, and has for its objects to produce a comparatively simple, inexpensive device of this character which in practice will effectually raise the potatoes to the ground-surface and at the same time throw them laterally of the row, one which will pass freely through the ground, thus minimizing the strain upon the draft-animals, and one wherein the depth of entrance of the plow into the ground may be conveniently regulated.

With these and other objects in view the invention comprises the novel features of construction and combination of parts more fully hereinafter described.

In the accompanying drawing there is shown a perspective view of an implement embodying the invention.

Referring to the drawing, 1 designates the draft-beam included in a frame which also comprises handle-bars 2 and a cross piece or beam 3, which latter is attached to the rear end of the beam 1 and to which the handles 2 are in turn attached.

Attached to the beam 1 at a point suitably remote from the cross-piece 3, by means of a transverse connecting-bolt 4, is a pair of relatively spaced vertical arms or members 5, having journaled between their lower ends a rotary transporting-roller 6, there being provided in the members 5 a vertically-spaced series of openings 7, adapted to accommodate the bolt 4 for permitting vertical adjustment of the arms and for varying the height of the frame from the ground, while connected at their lower ends with the members 5 is a pair of brace-rods 8, in turn connected at their upper ends to the beam 1 at a point in advance of the bearing-arms and serving to brace the latter in vertical position. The arms are provided with a second series of vertically-spaced openings 9, adapted to receive the ends of the braces 8 and to permit adjustment of the latter relative to the adjustment of the arms.

Bolted or otherwise secured to the beam 1 is a downwardly and forwardly inclined standard 10, equipped at its lower end with a blade or share 11, adapted to enter the soil beneath the potatoes during the digging operation, there being extended transversely through the standard 10 at relatively spaced intervals a series of lifting and deflecting arms or tines 12 of relatively decreasing lengths from the uppermost to the lowermost, as shown, the tines being downwardly and rearwardly curved throughout their entire length from end to end on a line perpendicular to the longitudinal axis of the standard. Attached to the cross-piece 3 of the frame is a pair of brace members or rods 13, connected at their lower ends with and for bracing the standard 10.

In practice the machine is transported over the ground by the roller 6, which travels on the ground-surface, and in the digging operation the blade 11 enters the soil beneath the potatoes or the like, which travel upward upon the tines 12 and are lifted by the latter to the ground-surface and then directed toward the sides of the row out of the path of the operator. As the machine advances the blade 11 and tines 12 will travel with comparative freedom through the soil, thus minimizing the strain upon the draft-animals, and the depth of entrance of the blade into the ground may be varied by adjusting the bearing-arms 5 vertically, as before explained and as will be understood. It is to be particularly noted that the tines are removably entered through the openings in the standard and may therefore in the event of becoming broken or otherwise damaged be readily removed for renewal and, further, that owing to the tines being of relatively decreasing lengths from the uppermost to the lowermost the facility with which the device enters and passes through the soil is materially increased. Also it will be observed that owing to the peculiar formation of the tines 12 and their disposition with respect to the standard the potatoes or other vegetables being dug will be lifted to the ground-surface and thrown transversely outward to be deposited on the surface at the sides of the row.

Having thus described my invention, what I claim is—

A digging device of the class described comprising a frame, a downwardly and forwardly inclined standard connected there-with, a blade carried at the lower end of the standard for opening the soil, and a plurality of vertically-spaced tines extended transversely of the standard above the blade, said tines being of relatively decreasing lengths from the uppermost to the lowermost and curved downwardly and rearwardly throughout their entire length from end to end in planes perpendicular to the longitudinal axis of the standard In testimony whereof I affix my signature in presence of two witnesses.

JOSEPH SMITH.

Witnesses:
   Geo. H. Chamberlain,
   Geo. H. Chamberlain, Jr.